United States Patent [19]

Gitlin et al.

[11] 4,253,184
[45] Feb. 24, 1981

[54] PHASE-JITTER COMPENSATION USING PERIODIC HARMONICALLY RELATED COMPONENTS

[75] Inventors: Richard D. Gitlin, Monmouth Beach; Stephen B. Weinstein, Holmdel, both of N.J.

[73] Assignee: Bell Telephone Laboratories, Incorporated, Murray Hill, N.J.

[21] Appl. No.: 91,832

[22] Filed: Nov. 6, 1979

[51] Int. Cl.³ .................. H03K 5/159; H04B 3/14
[52] U.S. Cl. ............................. 375/14; 333/18
[58] Field of Search ............ 333/18; 364/724; 375/11, 12, 14, 15; 328/155, 162

[56] References Cited
U.S. PATENT DOCUMENTS

| | | | |
|---|---|---|---|
| 3,935,535 | 1/1976 | Motley et al. | 375/15 |
| 3,962,637 | 6/1976 | Motley et al. | 375/14 |
| 4,061,978 | 12/1977 | Motley et al. | 375/15 |

*Primary Examiner*—Benedict V. Safourek
*Attorney, Agent, or Firm*—John Francis Moran

[57] ABSTRACT

A quadrature amplitude-modulated (QAM) data signal receiver employs a phase compensation arrangement (16, 31, 33) before the equalizer (17). The arrangement utilizes the assumption that the frequency components typically present in the phase perturbance are power-line related. This enables an effective phase compensator to be of relatively low complexity compared to the equalizer (17). Since the compensator is "pretuned", only the phase and amplitude of the frequency components need be adaptively found. This makes for a relatively stable arrangement with a suitable convergence rate. In an alternative arrangement, a phase compensator (216, 233, 240) is provided for use after the equalizer (217).

12 Claims, 7 Drawing Figures

PHASE-JITTER COMPENSATION USING PERIODIC HARMONICALLY RELATED COMPONENTS

TECHNICAL FIELD

This invention relates to the correction of distortion and/or impairments experienced by digital data signals after transmission over existing media of limited frequency bandwidth. In particular, the invention relates to the joint adaptive control of phase compensators and transversal equalizers in any linearly modulated system, for example, phase-modulated (PM) and quadrature amplitude-modulated (QAM) data transmission systems.

BACKGROUND OF THE INVENTION

Efficient digital data utilization of limited frequency band channels ordinarily used for telephone voice transmission is accomplished by multilevel high speed signals, making possible, for example, transmission at 9600 bits per second. Low error rates, however, can only be achieved by effective compensation of signal degradation otherwise highly destructive to data signals produced by such transmission channels, although this degradation is widely tolerated since it is innocuous to voice transmission. Linear distortion due to variations in attenuation and delay imparted to different frequency components produces the dispersion effect commonly known as intersymbol interference. Transversal filters are generally used as an effective means to compensate for intersymbol interference.

In addition to linear distortion, there are also carrier-phase perturbation effects which are harmful to digital data signals. A primary source for such effects is the frequency translation oscillator of a frequency division multiplex (FDM) channel bank. The low-level, but omnipresent, power supply ripple in these oscillators contributes phase-jitter to the digital data signal at the fundamental and other low order harmonic frequencies of the AC power frequency.

In U.S. Pat. No. 3,878,468 issued to D. D. Falconer et al. on Apr. 15, 1977, an arrangement utilizing a phase-jitter compensator connected to the output of an equalizer is disclosed for providing jitter-free passband equalization of data signals. One disadvantage of this arrangement is that the linear channel distortion is compensated initially before phase-jitter is controlled which will distort any phase-jitter which may be present, i.e., the equalizer precedes the jitter control circuitry. Full cancellation of phase-jitter is possible by this prior art arrangement only if the phase-jitter occurs in the transmission path prior to the signal being subjected to linear channel distortion. This assumption is valid for some channels, but should the distortion effects occur in the reverse order the equalizer actually aggravates the phase-jitter as previously mentioned thereby frustrating effective phase compensation. The delay experienced by the correction signals in the Falconer receiver renders inoperable a reversal by changing the order of the equalizer and phase-jitter compensation, owing to potential instability problems.

SUMMARY OF THE INVENTION

Broadly, the invention takes the form of a phase compensator wherein the predominant frequency components of the phase perturbation are assumed to be power line related so that only the phase and amplitude of these components need be adapted to provide effective phase compensation.

In the illustrative embodiments of the invention, phase compensation is provided either before or after equalization in a data receiver. The phase compensator includes a phase rotator controlled by a processor. The phase rotator utilizes clocking means for generating a first periodic signal whose frequency substantially corresponds to the predominant frequency component of the perturbation likely to be present in the received data. The processor uses the first periodic signal and produces changes in the phase and amplitude of vector estimates defined in terms of Cartesian coordinates or rectangular trigonometric coordinate estimates. These changes are determined by signal values selectively derived from the equalizer which employs dual tapped delay lines feeding multipliers whose gains are controlled by accumulators jointly responsive to tap signals and passband error signals. The passband error signals are produced by demodulation and remodulation circuitry also present in the data receiver.

In some aspects of the invention, the phase compensator comprises combining means for producing the phase compensated quadrature related data signals which are connected with the outputs of first and second multipliers. The first and second multipliers each have a first pair of adapted inputs to receive both of the quadrature related data signals and each have a second pair of inputs which are connected to receive different rectangular trigonometric coordinate estimates derived from the first periodic signal generated in the processor. In one application of the invention, phase compensation occurs before equalization while in another application equalization is performed before phase compensation.

In some still further aspects of the invention, the clocking means of the processor produces additional periodic signals harmonically related to the first periodic signal. Individual adjusting means for each periodic signal includes lookup table means responsive to the clocking means for producing rectangular trigonometric functions which are further processed to form the rectangular trigonometric coordinate estimates. This processing involves modulation using selected signal values produced by the equalizer. An accumulator combines past trigonometric rectangular coordinate estimates with each current increment to form the output estimate.

DETAILED DESCRIPTION

Figure 1:
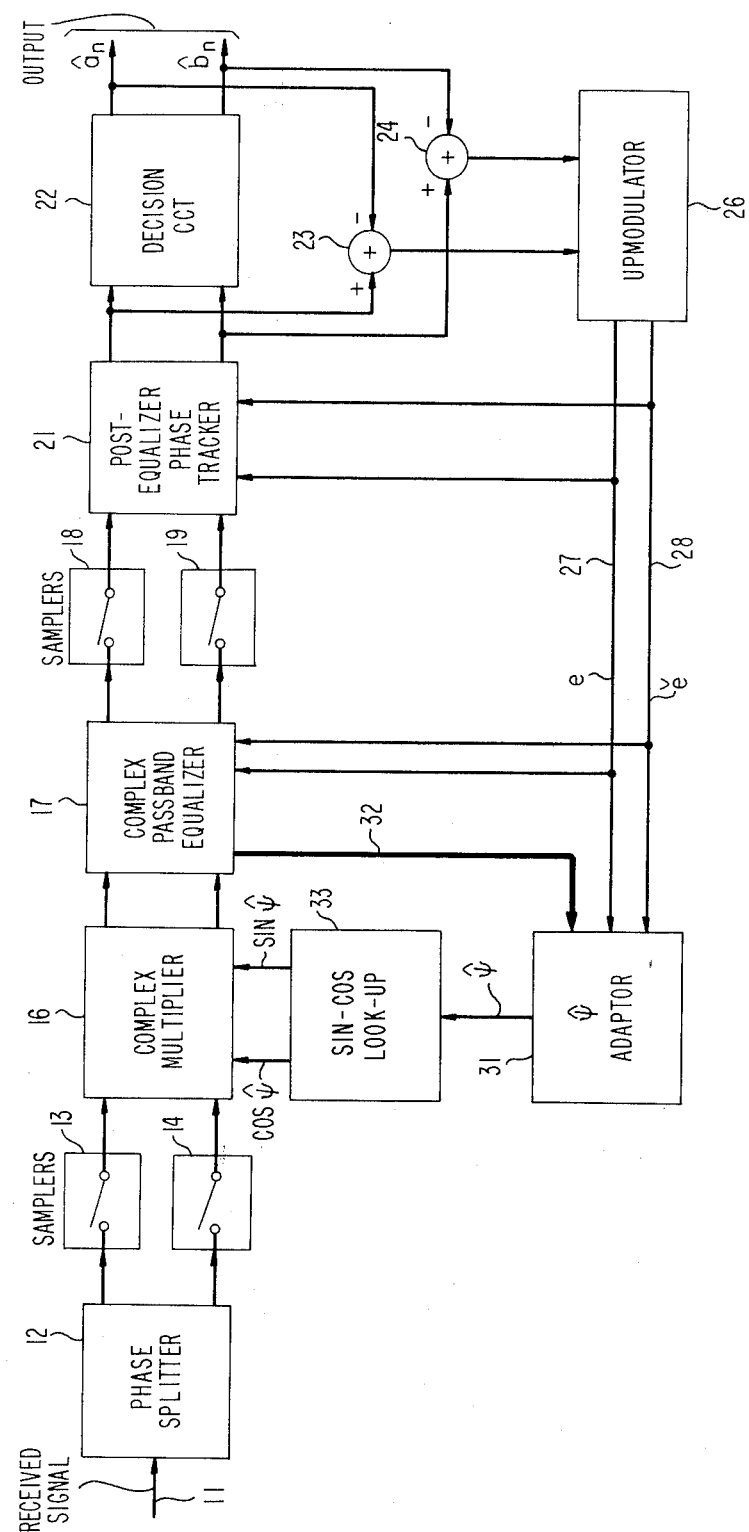
FIG. 1 is an overall block diagram of a QAM data signal receiver utilizing the inventive phase compensator.

FIG. 1 is an overall block diagram of a QAM receiver constructed in accordance with the invention. At input 11, the received data signal is applied to phase splitter 12 which separates the composite data signal into quadrature related components of suitable form termed inphase and quadrature signals. The inphase signal is applied to sampler 13, while the quadrature signal is applied to sampler 14. Since timing recovery and synchronization circuitry are well known to those working in the art, it is omitted from FIG. 1 for the sake of simplicity. From this point forward in the receiver of FIG. 1, a signal path is maintained for each of the receiver components through to the baseband data signals which are produced at the receiver outputs at the right of the figure. Although serially connected complex multiplier 16 and complex baseband equalizer 17 provide a signal path for each of the phase signals, these components provide internal cross-coupling between the signal paths which will become evident later in the discussion of these particular components.

The outputs of equalizer 17 are applied via samplers 18 and 19 to post-equalizer (data-directed) phase tracker 21 and decision circuit 22. It should be pointed out that samplers 13 and 14 run at a rate compatible with the spacing of the signal taps used in equalizer 17. If this rate is greater than the baud which is the situation utilized herein, additional samplers, such as samplers 18 and 19, are employed at the output of equalizer 17 for operating at the sampling rate. Since these components are both conventional in design and construction, detailed discussion of them is not warranted. Decision circuit 22 provides the recovered baseband data and, in conjunction, with algebraic combiners 23 and 24 provides decision-directed operation through upmodulator 26. Upmodulator 26 provides two output signals known as the passband inphase error signal e, on conductor 27 and the passband quadrature error signal ĕ, on conductor 28. These signals are used by tracker 21 and equalizer 17 in the conventional adaption process performed by these respective components. It should be made clear that tracker 21 is used to compensate for continuous low-frequency (slowly varying) components which may also be present in the data signal as opposed to the relatively-fast phase jitter to which this invention is directed. The error signals on conductors 27 and 28 are also applied to ψ adaptor 31 along with selected signal amplitudes and selected coefficient values used within equalizer 17 which are available on multiple-conductor cable 32. The output signal of adaptor 31, termed $\hat{\psi}$ or the estimate of phase-jitter, is fed into sin-cos lookup 33 to control the operation of complex multiplier 16, which provides phase rotation of the received data signal that serves as pre-equalizer phase-jitter compensation.

A feature of this particular arrangement is that ψ adaptor 31 utilizes the fact that the primary phase perturbance is frequently caused by interference at the power line frequency and associated low-order harmonics frequencies, thus the $\hat{\psi}$ adaptor provides harmonically related sinusoids for which the correct amplitudes and phases are adaptively adjusted. This allows the control loop of adaptor 31 to be relatively tight or narrow band with small step size correction and still provide an acceptable convergence rate. Accordingly, the operating characteristics of complex multiplier 16 allow it to be located before equalizer 17 without producing instability problems that would be otherwise produced by the processing delay through the equalizer.

Before proceeding with further discussion of the illustrative embodiments of the invention, analytical information pertinent to the principles of this invention will be presented. For purposes of illustration, it is to be assumed that the phase compensator-equalizer receiver of this invention is being employed in a high-speed telephone voiceband data transmission system utilizing inphase and quadrature pulse-amplitude modulated (QAM) signals. The basic signal rate is the reciprocal (1/T) of the baud (symbols per second) interval divided into two orthogonal, i.e., differing by ninety electrical degrees, phases of a common carrier frequency. The data signals applied to each orthogonal carrier phase may be independent, although synchronized and multilevel. As an example, 4-level baseband data signals can be applied to each orthogonal carrier phase for a practical maximum overall binary data rate of 4/T bits per second with a baud of 1/T. Thus a typical baud of 2400 symbols per second provides the highspeed data rate of 9600 bits per second. However, multilevel signaling and a high symbol rate increase the accuracy required in recovering the baseband data signal, which is subjected to both linear distortion and carrier phase perturbance. This increases the demands upon the phase-jitter compensation and equalization capabilities of receivers particularly when transmission is over the automatically switched and routed channels characteristic of the direct distance dialing telephone network.

In high-speed data transmission, a frequently used representation of the received signal, r(t), is in terms of the analytic signal, r̃(t). The received filtered signal (neglecting additive noise) may be expressed as $$r(t) = Re \, \tilde{r}(t) = Re \, \sum_n a_n \tilde{h}(t - nT) e^{j[\omega_c t + \psi(t)]}. \qquad (1)$$

The underlying assumption of this model presumes that there is no substantial linear distortion between the point where phase-jitter enters the system and the receiver. In equation (1) Re donotes the real part of a complex number, the overbar denotes a complex variable, $\tilde{a}_n = a_n + jb_n$ is the discrete-valued multilevel data sequence, $\tilde{h}(t)$ the baseband-equivalent system impulse response, $T^{-1}$ the symbol rate or baud $\omega_c$ the radian carrier frequency, and $\psi(t)$ depicts the phase-jitter process. Thie complex signal notation is a convenient way of representing the inphase and quadrature signals in a QAM-type system. In the receiver arrangement of FIG. 1, the signal and its Hilbert transform are bandpass filtered, equalized (by an equalizer with taps spaced T' sec apart), and then demodulated and detected. Since the complex analytic signal r̃(t), which is the sum of the signal r(t) and $\sqrt{-1}$ times its Hilbert transform, [r̂(t)], is generated as the first operation of the receiver, it would seem appropriate to cancel out, at that point, as much as possible of the undesired ψ(t), e.g., by an operation $$e^{-j\hat{\psi}(t)} \tilde{r}(t), \qquad (2)$$

where $\hat{\psi}(t)$ is an estimate of ψ(t). It is a primary concern to formulate a particular estimate $\hat{\psi}(t)$ based on a priori knowledge of the spectrum of the phase-jitter, and to propose pre-equalizer phase-jitter correction. It should be clear that the phase angle due to the carrier, $\omega_c t$, can be eliminated at any one of several points in the receiver.

With the model of equation (1) and FIG. 1, in which phase-jitter occurs following the bulk of the linear channel distortion, the (complex) analytic contents of the $2m+1$ tap equalizer delay line at time nT are the received samples $$(\tilde{x}_{n-M}, \tilde{x}_{n-M+1}, \ldots, \tilde{x}_{n+M}), \quad (3)$$

where the time interval T' between adjacent samples may be either the symbol interval T or an appropriate (rational) fraction of T. With this jitter model, $$\tilde{x}_n = \tilde{s}_n e^{j\psi_n} e^{-j\hat{\psi}_n} = \tilde{r}_n e^{-j\hat{\psi}_n}, \quad (4)$$

where $\tilde{s}_n$ is the complex received sample except for the phase-jitter and $\tilde{r}_n$ is the received bandpass filtered sample. Based upon the empirically observed fact that large phase-jitter is generally dominated by periodic components at the power-line frequency, along with a small number of harmonics, the samples of the jitter will be represented as $$\psi(nT) = \sum_{k=1}^{K} Z_k \cos(k\omega_0 nT' + \Phi_k). \quad (5)$$

Thus, the phase-jitter is presumed periodic with fundamental frequency $\omega_0/2\pi$ Hz and K harmonic components. The amplitudes, $\{Z_k\}$, and phases, $\{\Phi_k\}$, of the harmonic components are presumed to be unknown, and it will be the object of the cancellation algorithm to adaptively estimate these parameters. Note that since the $\Phi_k$'s are time varying, any small error in knowledge of the fundamental frequency, $\omega_0$ can be readily absorbed by phase variations. With this model the phase-jitter estimate will be constructed as $$\hat{\psi}(nT') = \sum_{k=1}^{K} \hat{Z}_k \cos[k\omega_0 nT' + \hat{\Phi}_k]. \quad (6a)$$

For now it will be convenient to use the quadrature representation of the estimate, i.e., $$\hat{\psi}(nT') = \sum_{k=1}^{K} [\hat{U}_k \cos k\omega_0 nT' - \hat{V}_k \sin k\omega_0 nT'], \quad (6b)$$

where $$\hat{U}_k = \hat{Z}_k \cos \hat{\Phi}_k, \quad \hat{V}_k = \hat{Z}_k \sin \hat{\Phi}_k. \quad (7)$$

Thus the equalizer output at time nT is, denoting the complex coefficients or tap weights by $\{\tilde{c}_m\}$, $$\tilde{y}_n = \sum_{m=-M}^{M} \tilde{c}_m \tilde{x}(nT - mT) \quad (8)$$

$$= \sum_{m=-M}^{M} \tilde{c}_m \tilde{r}(nT - mT) e^{-j\hat{\psi}(nT - mT)}.$$

With the above relations it should be clear that if the phase correction and equalization are effective, then $\tilde{y}_n = \tilde{a}_n$. Using the above, the (complex) error at the decision instant nT is $$\tilde{e}_n = \tilde{y}_n - \tilde{a}_n, \quad (9)$$

where $\tilde{a}_n$ is the reference datum which is initially provided during a training period and is subsequently replaced by actual decisions (when the error rate is sufficiently low), and the receiver will simultaneously adjust the equalizer tap weights and the phase-estimator parameters to minimize the sum of the inphase and quadrature mean-squared errors. Let $\tilde{x}_n$ denote the samples in the equalizer delay line at $t=nT$, in other words $\tilde{x}_n = [x(nT+MT'), \ldots, x(nT), x(nT-T'), \ldots, x(nT-MT')]$; also $\tilde{r}_n$ denotes the corresponding vector of received samples, $\underline{\tilde{c}}$ the equalizer tap vector, $\underline{\hat{\psi}}_n$ the vector of phase estimates $(\hat{\psi}(nT+MT'), \ldots, \hat{\psi}(nT), \ldots, \hat{\psi}(nT-MT'))$, and define the diagonal matrix $P(\underline{\hat{\psi}}_n)$, the $m^{th}$ entry of which is $$\hat{P}(\underline{\hat{\psi}}_n)_m = e^{j\hat{\psi}(nT - mT')} \quad (10)$$

The equalizer output can now be expressed as $$\tilde{y}_n = \underline{\tilde{c}} \tilde{x}_n = \underline{\tilde{c}}' P(\underline{\hat{\psi}}_n) \tilde{r}_n \quad (11)$$

Now the sum of the inphase and quadrature mean-squared errors, D, can be represented as $$D = E[|\tilde{e}_n|^2] = \\ E\{[\underline{\tilde{c}}' P(\underline{\hat{\psi}}_n) r_n - \tilde{a}_n] [\underline{\tilde{c}}' P(\underline{\hat{\psi}}_n) r_n - \tilde{a}_n]^*\}, \quad (12)$$

where E denotes the ensemble average with respect to the data symbols and additive noise and the asterisk is the complex conjugate. In the expression of equation (12) the phase-jitter is assumed to be fixed, but unknown, at each tap of the delay line. Performing the indicated averaging gives the quadratic expression $$\underline{\epsilon} = \underline{\tilde{c}}' P_n E[\tilde{r}_n \tilde{r}_n^{*'}] P_n \underline{\tilde{c}} - 2 Re \underline{\tilde{c}}' P_n E[\tilde{a}_n \tilde{r}_n^*] + E[|\tilde{a}_n|^2], \quad (13)$$

where $P_n = P(\underline{\hat{\psi}}_n)$. Since under the assumed model the received sample vector, $\tilde{r}_n$, has a strong periodic component, namely the phase-jitter, the receiver will of necessity be time varying. By differentiating the quadratic form, equation (13), with respect to the cascaded phase-tracker/equalizer, $P_n \underline{c}$, we obtain $$p_n \underline{\tilde{c}} = \{E[\tilde{r}_n \tilde{r}_n^{*'}]\}^{-1} E[\tilde{a}_n \tilde{r}_n^*]; \quad (14)$$

in other words there is an infinite, or continuous, combination of equalizer and phase-tracking parameters which achieves the minimum mean-squared error. It is important to realize, however, that all of these solutions result in the same mean-squared error. If the phase-jitter were constant along the length of the equalizer delay line, the matrix, $P_n$ could be replaced by the scalar $e^{-j\hat{\psi}_n}$. However, since practical interest is in tracking 60 Hz jitter, the model may not be simplified in this manner. By virtue of the above phase-jitter model the channel-correlation matrix, $<\tilde{r}_n \tilde{r}_n^{*'}>$ is independent of the phase-jitter, and is thus time invariant. However, the vector, $<\tilde{a}_n \tilde{r}_n>$ will be proportional to the product of $e^{-j\hat{\psi}_n}$ with the complex channel impulse-response vector and will, in general, be time-varying. Note that one solution of equation (14) is that $\hat{\psi}_n$ simply equal $\psi_n$, i.e., the phase estimator tracks the jitter perfectly.

With the foregoing background, attention is directed to specifying the algorithms which govern the parameter adjustment. As is common in data transmission applications, a variation of the steepest-descent algorithm is used in which the true gradient of the mean-squared error is replaced by an unbiased estimate. This class of algorithms, referred to as the least-mean squares (LMS) class, can be readily adapted for this approach. The parameter estimates are modified, at the symbol rate (or less frequently), by a correction which is in the direction to minimize the instantaneous squared error, $|\tilde{e}_n|^2$. For the equalizer tap weights this algorithm, which is sometimes also referred to as the estimated-gradient algorithm, would be of the well-known form:

$$\tilde{c}_{n+1} = \tilde{c}_n - \alpha \frac{\partial |\tilde{e}_n|^2}{\partial \tilde{c}_n} = \tilde{c}_n - \alpha \tilde{e}_n \tilde{x}_n^* \quad (15)$$

where $\alpha$ is a positive number called the step size. The phase-tracking algorithm is, analogously, $$\hat{U}_k(n+1) = \hat{U}_k(n) - \beta \frac{\partial |\tilde{e}_n|^2}{\partial \hat{U}_k(n)} \quad k = 1,2,...K \quad (16)$$

where $\beta$ is the step size, and a similar algorithm holds for $\hat{V}_k$. The required derivatives are computed to be $$\frac{\partial |\tilde{e}_n|^2}{\partial \hat{U}_k} = \quad (17)$$

$$-2 \, Im \left\{ \tilde{e}_n^* \sum_{m=-M}^{M} \tilde{c}_m \tilde{x}(nT - mT) \cos k\omega_0(nT - mT) \right\}$$

$$\frac{\partial |\tilde{e}_n|^2}{\partial \hat{V}_k} = \quad (18)$$

$$2 \, Im \left\{ \tilde{e}_n^* \sum_{m=-M}^{M} \tilde{c}_m \tilde{x}(nT - mT) \sin k\omega_0(nT - mT) \right\}$$

Equations (15) through (18) comprise the adaptive algorithms governing the receiver, and an exact analysis of this nonlinear system of equations is extremely difficult. However, considerable insight into the convergence of the algorithm can be obtained by considering a specialized operating condition.

In this case, the convergence of the phase tracking parameters is assumed for a "perfect" channel. Without linear distortion only one tap of the equalizer will be of nonzero magnitude, and the following relations hold:

$$\tilde{r}_n = \tilde{a}_n e^{j(\psi_n + n\omega_c T)} \quad (19)$$

$$\tilde{x}_n = \tilde{y}_n = \tilde{a}_n e^{-j(\hat{\psi}_n - \psi_n)}. \quad (20)$$

If attention is restricted further to the case of only one harmonic component in the phase-jitter then $$\psi_n = U \cos \omega_0 nT - V \sin \omega_0 nT$$

$$\hat{\psi}_n = \hat{U}_n \cos \omega_0 nT - \hat{V}_n \sin \omega_0 nT, \quad (21)$$

and the output error is $$\tilde{e}_n = \tilde{a}_n [e^{-j(\hat{\psi} - \psi_n)} - 1]. \quad (22)$$

With the above assumptions the respective gradients, equations (17) and (18), simplify to $$\frac{\partial |\tilde{e}_n|^2}{\partial \hat{U}_n} = 2|\tilde{a}_n|^2 \cos \omega_0 nT \cdot \sin(\hat{\psi}_n - \psi_n) \quad (23a)$$

$$\frac{\partial |\tilde{e}_n|^2}{\partial \hat{V}_n} = -2|\tilde{a}_n|^2 \sin \omega_0 nT \cdot \sin(\hat{\psi}_n - \psi_n). \quad (23b)$$

Thus from equation (21) the phase error at any iteration will be of the form $$\hat{\psi}_n - \psi_n = (\hat{U}_n - U_n) \cos n\omega_0 T - (\hat{V}_n - V_n) \sin n\omega_0 T \quad (24)$$
$$= \epsilon_n \cos n\omega_0 T - \check{\epsilon}_n \sin n\omega_0 T,$$

where $\epsilon_n$ and $\check{\epsilon}_n$ are the in-phase and quadrature phase-tracking errors respectively. The iterative equations which $\epsilon_n$ and $\check{\epsilon}_n$ satisfy can now be derived. From equation (23), we have $$\hat{U}_{n+1} = \hat{U}_n - \beta_0 |\tilde{a}_n|^2 \cos \omega_0 nT \cdot \sin(\hat{\psi}_n - \psi_n) \quad (25a)$$

$$\hat{V}_{n+1} = \hat{V}_n + \beta_0 |\tilde{a}_n|^2 \sin \omega_0 nT \cdot \sin(\hat{\psi}_n - \psi_n), \quad (25b)$$

and an appropriate step-size, $\beta$, can be selected which absorbs the fluctuations due to a multilevel signal, i.e., $$\beta_0 \beta / |\tilde{a}_n|^2. \quad (26)$$

If the assumption is made of a small tracking error, equations (24-26) may be used for the error equations $$\epsilon_{n+1} = \epsilon_n - \beta \cos \omega_0 nT \cdot [\epsilon_n \cos \omega_0 nT - \check{\epsilon}_n \sin \omega_0 nT]$$

$$\check{\epsilon}_{n+1} = \check{\epsilon}_n + \beta \sin \omega_0 nT [\epsilon_n \cos \omega_0 nT - \check{\epsilon}_n \sin \omega_0 nT], \quad (27)$$

which can be rewritten as the automomous periodically time-varying system $$\epsilon_{n+1} = [1 - \beta(1 + \cos 2\omega_0 nT)]\epsilon_n + \beta[\sin 2\omega_0 nT]\check{\epsilon}_n \quad (28a)$$

$$\check{\epsilon}_{n+1} = [1 - \beta(1 - \cos 2\omega_0 nT)]\check{\epsilon}_n + \beta[\sin 2\omega_0 nT]\epsilon_n. \quad (28b)$$

With the introduction of the notation $$\underline{\epsilon}_n = \begin{bmatrix} \epsilon_n \\ \check{\epsilon}_n \end{bmatrix} \quad (29a)$$

$$A_n = \begin{bmatrix} 1 - \beta(1 + \cos 2\omega_0 nT) & \beta \sin 2\omega_0 nT \\ \beta \sin 2\omega_0 nT & 1 - \beta(1 - \cos 2\omega_0 nT) \end{bmatrix} \quad (29b)$$

equation (28) can be written compactly as $$\underline{\epsilon}_{n+1} = A_n \underline{\epsilon}_n, \quad (30)$$

where the period of $U_n$ will be denoted by $N = \pi/\omega_0 T$, i.e., for any integer l, $U_n = U_{n+lN}$. Note that $A_n$ can be written as $$A_n = (1-\beta)I + \beta \begin{bmatrix} -\cos 2\omega_0 nT & \sin 2\omega_0 nT \\ \sin 2\omega_0 nT & \cos 2\omega_0 nT \end{bmatrix} = (1-\beta)I + \beta P_n \quad (31)$$

where I is the identity matrix and the orthogonal matrix $P_n$ is recognized as a rotation by $\omega_0 nT$ radians followed by a reflection. Convergence of the algorithm, equation (25), can be demonstrated by investigating the decay of the norm of the error vector. If $\theta_n$ denotes the angle between $\underline{\epsilon}_n$ and $P_n \underline{\epsilon}_n$, then the squared norm of the error vector, $\underline{\epsilon}'_n \underline{\epsilon}_n$, can be computed from equations (30) and (31) as $$\underline{\epsilon}'_{n+1} \underline{\epsilon}_{n+1} = [1 - 2\beta(1-\beta)(1-\cos \theta_n)] \underline{\epsilon}'_n \underline{\epsilon}_n \quad (32a)$$

where $$\cos\theta_n = [(\epsilon_n^2 - \tilde{\epsilon}_n^2)\cos 2\omega_0 nT + 2\epsilon_n\tilde{\epsilon}_n \sin 2\omega_0 nT]/[\epsilon_n^2 + \tilde{\epsilon}_n^2] \quad (32b)$$

and where it is recalled that (for orthogonal matrices) $P'_n P_n = I$. Equation (32) indicates that, as long as $\beta$ is less than unity, the norm of the error vector will decrease at each iteration, except for the values of n such that $\cos\theta_n = 1$. For these values of n the error vector will remain unchanged. Thus in a cycle of N iterations, the rate of decay varies from $1 - 2\beta(1-\beta)$ to zero. If we let $$q_n = -\tilde{\epsilon}'_n \tilde{\epsilon}_n, \quad (33)$$

then from equation (32) we have $$q_{n+1} = (1 - \gamma_n)q_n, \quad (34)$$

where for $0 < \beta < 1$ $$0 \leq \gamma_n \overset{\Delta}{=} 2\beta(1-\beta)(1-\cos\theta_n) \leq 4\beta(1-\beta). \quad (35)$$

Note that for n an integral multiple of N we have $$q_{n+1} = \prod_{m=0}^{n}(1-\gamma_m)q_0 = \prod_{m=0}^{N}(1-\gamma_m)^{n/N}q_0, \quad (36)$$

where the periodicity of $\Delta_m$ is used to express the product in terms of N distinct terms. As previously remarked, one of the terms in the products is unity, while all the others are positive and less than one. A rough bound on convergence is obtained by replacing (i.e., upper bounding) all but one of the terms in the product by unity and saving the most rapid decay; this results in the convergence bound, $$q_{n+1} \leq [1 - 4\beta(1-\beta)]^{n/N}q_0, \quad (37)$$

on the parameter-error vector, and at least for this case it can be concluded that the phase-parameter estimates converge at an exponential rate to the true values.

Figure 2:
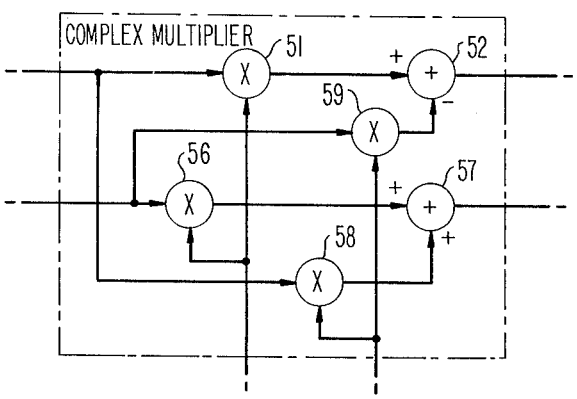
FIG. 2 depicts a complex multiplier which may be used in the phase compensator of FIG. 1.

FIG. 2 illustrates the internal structure of complex multiplier 16 which serves as the pre-equalizer variable phase shifter in FIG. 1. Basically, complex multiplier 16 has two signal paths with cross-coupling therebetween. The first straight through signal path is for the inphase signal produced by the output of sampler 13 and includes multiplier 51 which in turn is coupled to algebraic adder 52. The other straight through signal path is for the quadrature phase signal output of sampler 14. This signal path includes serially connected multiplier 56 and algebraic adder 57. The other product inputs of multipliers 51 and 56 have applied to them the signal representing the $\cos\psi$ from sin-cos lookup 33 of FIG. 1.

For the cross-coupling, the signal from sampler 13 is also applied to multiplier 58 whose output provides the other input for algebraic adder 57. The other cross-coupling signal path includes multiplier 59 whose signal input is supplied by sampler 14. Similar to multiplier 58, multiplier 59 provides the other input to algebraic adder 52. The remaining product inputs to multipliers 58 and 59 is the $\sin\psi$ signal. The $\sin\psi$ signal is also produced by sin-cos lookup 32 in FIG. 1.

Figure 3:
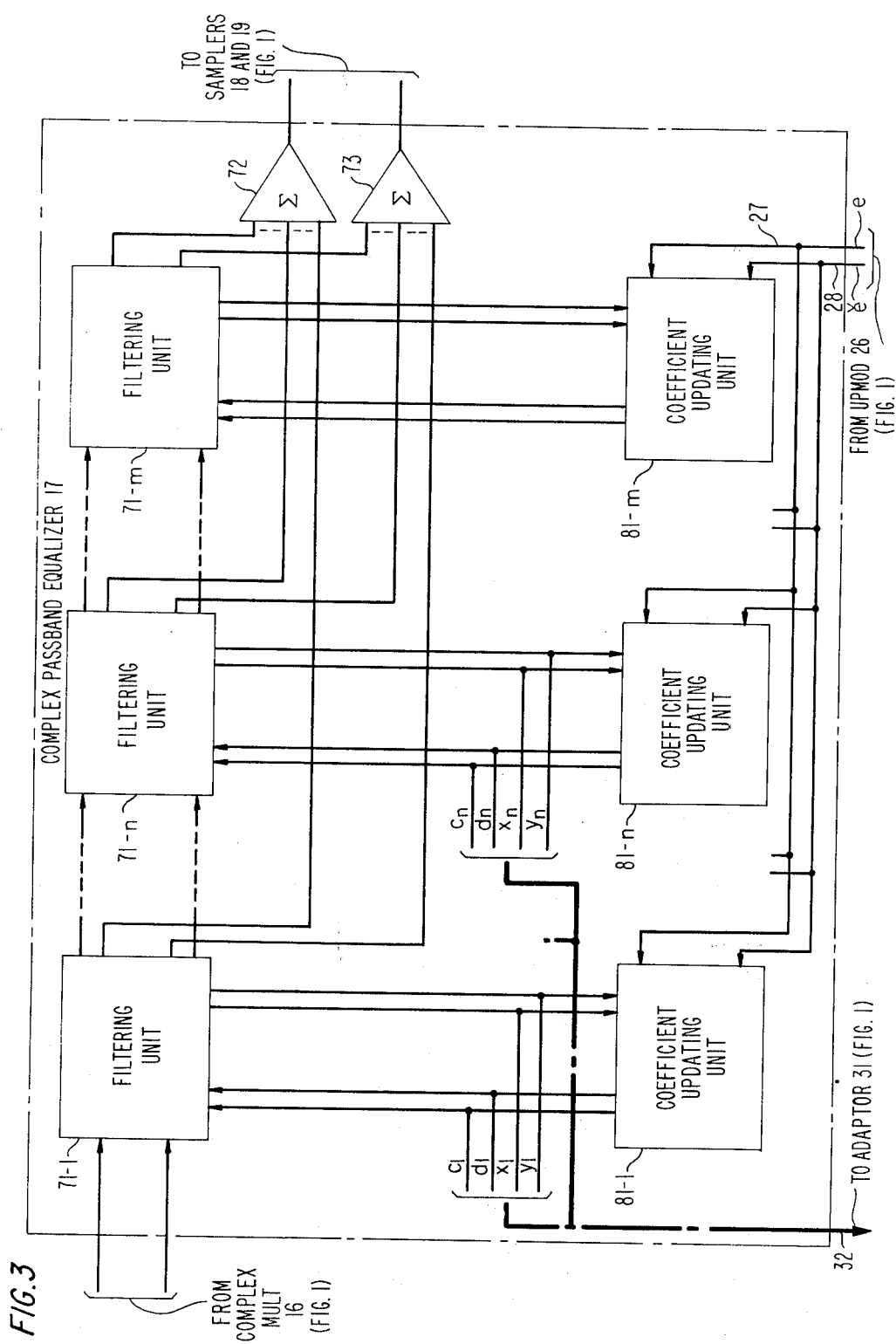
FIG. 3 illustrates the unitized structure of an equalizer suitable for use in FIG. 1.

FIG. 3 depicts the generalized unit structure of complex passband equalizer 17 in FIG. 1. The signal operative portion of complex passband equalizer 17 includes a series of cascade filtering units 71-1 through 71-m. Each of filtering units 71 has two signal inputs, one for the inphase signal and one for the quadrature phase signal. There is a maximum of four signal outputs for each of filtering units 71. Two signal outputs of all but the final unit are applied to the next successive filtering unit while the product outputs of the equalizer are applied to either summer 72 or summer 73 whose outputs are respectively for the inphase signal and quadrature phase signal. The first two mentioned signal outputs are merely delayed versions of the input signal applied to each of units 71.

There is a corresponding coefficient updating units 81 for each of filtering units 71 so, in total, there are two sets of m such units. Coefficient updating units 81 each receive the inphase error signal e on conductor 27 and the quadrature phase error signal ẽ on conductor 28 which are produced by up-modulator 26 in FIG. 1. There are four conductors which couple each filtering unit to its corresponding coefficient updating unit. Two of the conductors from each of coefficient updating units 81 provide the signals which control the gain of multipliers internal to a filtering unit. These coefficient signals are designated as $c_m$ and $d_m$. The two conductors which run in the reverse direction, that is from one of filtering units 71 to the corresponding coefficient updating unit, provide signals which are utilized within updating unit 81 to help determine coefficient signals $c_m$ and $d_m$. The received signals are designated as x for the inphase signal and jX̃ for the quadrature phase signal. It should be understood that x̃ in the previous equation represents the complex sum of $x + jX̃$.

Before proceeding with internal structures of the units in FIG. 3, it should be noted that there is a plurality of m units for each of units 71 and 81. Furthermore, the nth unit is used to designate an intermediate unit. In addition, the cross-coupling between a filtering unit 71 and a corresponding coefficient updating unit 81 for units 1 through n are connected to cable 32 which provides the inputs for $\psi$ adaptor 31 of FIG. 1. In most cases, cable 32 will include inputs from only two or three units to provide control of $\psi$ adaptor 31. Furthermore, although the location of the units in equalizer 17 of FIG. 3 is at the signal input side, they may be readily changed to other positions to improve the performance of $\psi$ adaptor 31 when the channel phase jitter warrants such changes.

Figure 4:
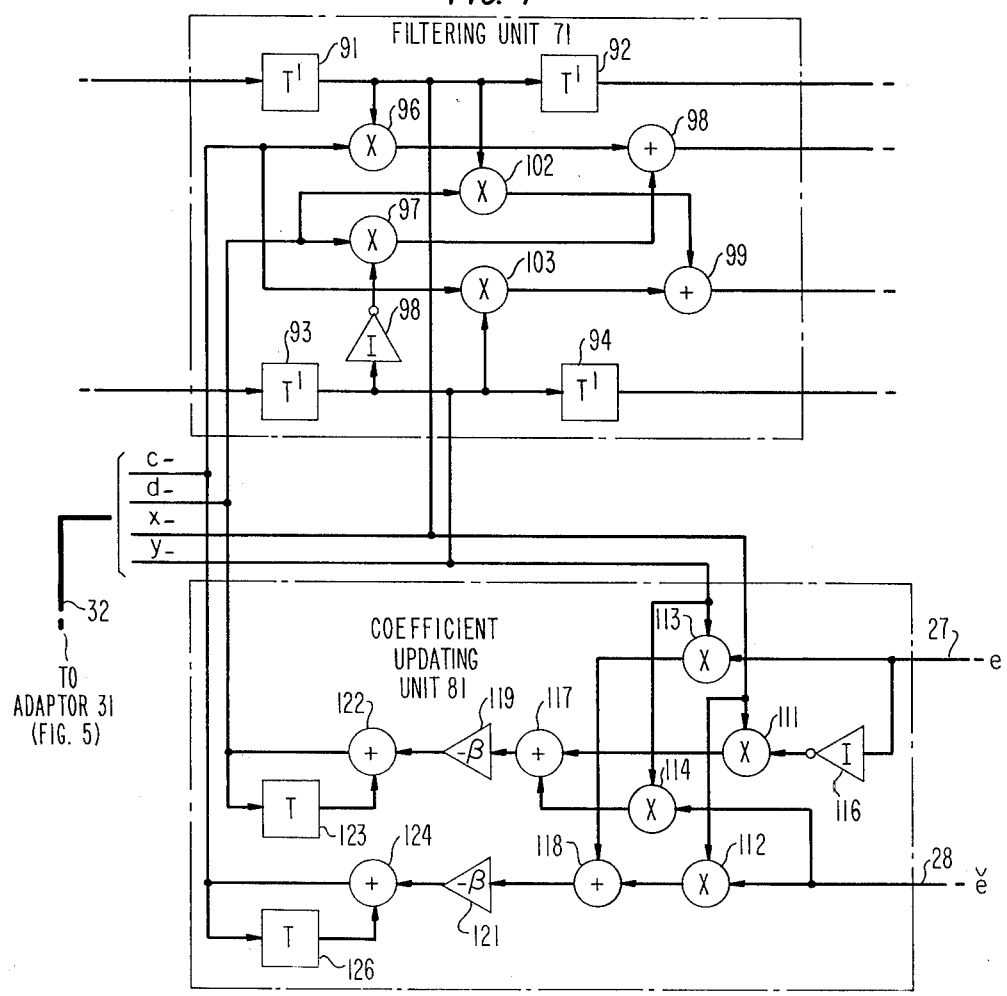
FIG. 4 depicts the internal circuitry of the units of FIG. 3.

FIG. 4 depicts the internal structure utilized in each of filtering units 71 and in each of coefficient update units 81. The signal paths for the inphase and quadrature phase signals are provided by serially cascaded delays 91 and 92 for the inphase signal while the quadrature phase signal path is provided by delays 93 and 94 which form a second tapped delay line. The signal outputs of delays 91 and 93 are respectively applied to multipliers 96 and 97 with the latter being applied via an inverter 98. The other inputs to multipliers 96 and 97 are the coefficient signals $c_m$ and $d_m$ respectively. The product outputs of multipliers 96 and 97 are applied to respective algebraic adders 98 and 99. The other inputs to algebraic adders 98 and 99 are provided by the outputs of multipliers 102 and 103. One input of each of multipliers 102 and 103 are the signal outputs produced by delays 91 and 93 of the respective tapped delay lines for the inphase signal and the quadrature phase signal. The other inputs to multipliers 102 and 103 are cross-coupled so that the input to multiplier 102 is the same as that of multiplier 97 while the input to multiplier 103 corresponds to that of multiplier 96.

With the additional inputs from multipliers 102 and 103, respective algebraic adders 98 and 99 provide the summation of signals whose individual contributing component amplitudes are adjusted in accordance with the gain of the internal multipliers in each of sections 71. The outputs of adders 98 and 99 in each of sections 71 provide the inputs to summers 72 and 73 in FIG. 3. Summer 72 produces the inphase equalizer output while summer 73 provides the equalizer output for the quadrature phase signal.

The remaining portion of FIG. 4 illustrates the internal structure of the corresponding one of coefficient updating units 81. The first two inputs of unit 81 are the outputs of delays 91 and 93. In particular, the signal from delay 91 is applied to multipliers 111 and 112 while the signal from delay 93 is applied to multipliers 113 and 114. The two remaining inputs to unit 81 are the inphase error signal, $\tilde{e}$, and quadrature phase error signal, $\check{e}$, produced by up-modulator 26 of FIG. 1. The phase error signal provides the second inputs for multipliers 113 and then 111 after inversion by inverter 116. The quadrature phase error signal is applied as the remaining inputs for multipliers 112 and 114.

Connected to the outputs of multipliers 111 and 114 is algebraic summer 117. Multipliers 112 and 113 provide the signals applied to the other algebraic summer 118. The output of algebraic summer 117 is applied to $-\beta$ amplifier 119 while the output of summer 118 is applied to $-\beta$ amplifier 121. At the output of amplifier 119, summer 122 and delay 123 are configured to act as an accumulator. Similarly, an accumulator at the output of amplifier 123 is provided by summer 124 and delay line 126. The output of the first accumulator is the coefficient signal $d_m$ and the coefficient signal $c_m$ is the output of the accumulator of delay 126. In addition to being applied to filter unit 71 these signals are also applied to cable 32 which is connected to $\hat{\psi}$ adaptor 31 of FIG. 1.

Now that equalizer 17 has been described, it is to be understood that the equalizer in itself is not inventive. Although fractionally spaced equalizers (i.e., adjacent taps are spaced closer than the data symbol rate; typically two taps per symbol) provide performance advantages and hence are more desirable, those skilled in the art may readily substitute other types of equalizers. The primary purpose for providing this detailed information for equalizer 17 is to illustrate clearly the derivation of the control signals in cable 32 which is used in the adaptive operation of $\hat{\psi}$ adaptor 31.

Figure 5:
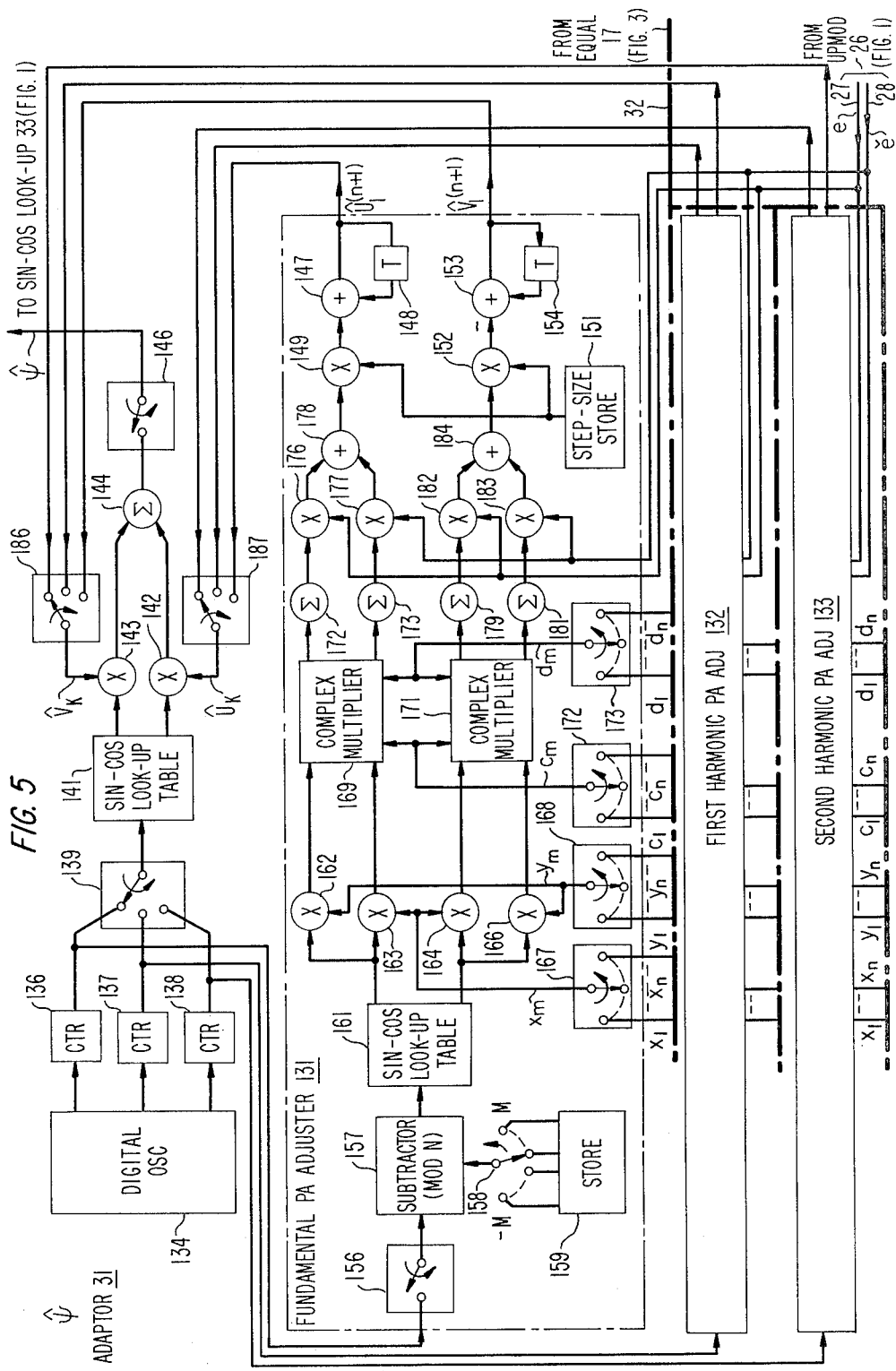
FIG. 5 illustrates internal circuitry which may be employed in the adaptor of FIG. 1.

FIG. 5 illustrates circuitry which may be utilized to perform the analytical operations in $\psi$ adaptor 31. In this case, $\psi$ adaptor 31 includes sections 131, 132 and 133 which each operate individually to adjust the phase and amplitude respectively of the fundamental, first harmonic and second harmonic replicas of power-line frequency induced phase-jitter. These particular harmonic components were selected because these frequency components, in most practical applications, are the dominant contributors of this type of phase-jitter. It is to be understood, however, that those skilled in the art may utilize the principles of the invention to construct more or less including other frequency components (such as higher harmonics or ringing current components) as may be warranted in the various applications of this invention. The remaining and common circuitry of FIG. 5, which is located in the upper portion thereof, serves to provide harmonically related rates and timed trigonometric functions utilized in the product term of the summation depicted in equation (6b).

In this example, digital oscillator 134 provides one of three harmonic related pulse repetition rates for each of counters 136-138. The fundamental is applied to counter 136 which is cyclical modulo N whose value is $1/f_0T'$ with $f_0$ being the power-line frequency and T' is the spacing between adjacent taps of the delay line in equalizer 17. Counter 137 and 138 provide the respective equivalent functions at the first and second harmonic frequencies. The output of each of these counters is applied to a terminal of sampler 139 and also to one of adjusters 131-133. Sampler 139 enables the output of each one of counters 136-138 to address sin-cos lookup table 141 once per revolution of the sampler.

For each address signal, table 141 produces the corresponding cos function as an input to multiplier 142 and the sin function for multiplier 143. Sampling commutators 146 and 147, which operate in synchronism with sampler 139, provide the corresponding $\hat{U}_k$ and $\hat{V}_k$ coefficient values to the remaining inputs of respective multipliers 142 and 143. The product outputs of multipliers 142 and 143 are combined in accumulator 144 whose stored value is strobed by sampler 146 to produce a signal indicative of $\hat{\psi}$ found in equation (6b). The fundamental components of the terms $\hat{U}_k$ and $\hat{V}_k$ are derived by adjuster 131 using the output of counter 136, the signal components of cable 32, and the error estimates from upmodulator 26.

For the fundamental component of the phase-jitter replica, the phase and amplitude values are determined by adjuster 131 to effect cancellation when combined with the received data signal in complex multiplier 16. Only adjuster 131 is shown in detail since adjusters 132 and 133 are similarly constructed and provide the same basic function except at the first harmonic and second harmonic frequencies. At the output side of adjuster 131, summer 147 and delay 148 combines the summation of previous in-phase and quadrature values $\hat{U}_1$, and $\hat{V}_1$ which are combined or updated by the output of multiplier 149. This operation is expressed by equation (16) where the value of $\beta$ is recorded in store 151 while the other input to multiplier 149 is the derivative $$\frac{\partial |\tilde{e}_n|^2}{\partial \hat{U}_1(n)}$$

that is processed by the circuitry preceding multiplier 149 in adjuster 131. The $\hat{V}_1$ coefficient is concurrently updated by the similar arrangement comprising multiplier 152, summer 153, and delay 154. The derivative input to multiplier 152 is processed by the circuitry in adjuster 131 that precedes the multiplier. As in the case of multiplier 149, the derivative input to multiplier 152 is scaled by the value of the constant $\beta$ from store 151. The value of $\beta$ actually is adjusted to allow for the factor of two in equations (17 and 18).

As previously mentioned, counter 136 provides the basic timing input for adjuster 131. This signal is strobed by sampler 156 and applied to subtractor 157. For each closure of the switch in sampler 156, commutator switch 158, connected to the other input of subtractor 157, cycles through its complete set of poles. Applied to each pole is a value of $mT'$ recorded in store or memory 159. The values in store 159 range from $-M$ to $M$ where M is the number of units in equalizer 17 that are used to provide signal sets of $x_m$, $\tilde{x}_m$ or $y_m$, $c_m$, and $d_m$ in cable 32. For each value in store 159, subtractor 157 reduces the value of sampler 156 accordingly and applies the difference to sin-cos lookup 161 which produces signal outputs indicative of trigonometric functions. The cos signal from lookup 161 is applied to multipliers 162 and 163 while the sin signal is coupled to multipliers 164 and 166. The other input to multipliers 163 and 164 is the set of $x_m$, which are the signal values from the delay line taps of equalizer 17 provided by cable 32. These signals are produced by commutating switch 167 which cycles through its poles at the same rate as switch 158 but has one-half the number of poles. This means that two values from store 159 are used to derive two respective trigonometric functions that are combined with each value of $x_m$ in both of multipliers 163 and 164. The same type of multiplications occur in multipliers 162 and 166 which are provided the quadrature phase tap signal, $X_m$, by the operation of commutator 168. The output signals of multipliers 162 and 163 are the electrical representation of the expression $\tilde{x}(nT-mT)\cos k\omega_0(nT-mT)$ in equation (17). Similarly, multipliers 164 and 166 provide the signal indicative of the expression $\tilde{x}(nT-mT)\sin k\omega_0(nT-mT)$ in equation (18). In this case, the value of k, the harmonic index, is unity corresponding to the fundamental. Also, $\tilde{x}$ is the composite expression of $x_m+jX_m$ also expressed using $x_m$ and $y_m$ in the drawing, the inphase and quadrature phase signal values at tap m of equalizer 17.

The outputs of multipliers 162 and 163 provide one set of inputs for complex multiplier 169 while the combined outputs of multipliers 164 and 166 similarly provide an input signal set for complex multiplier 171. The other common set of input signals to complex multipliers 169 and 171 are provided by commutators 172 and 173. The term $\tilde{c}_m$, in equations (17 and 18), is the composite expression for $c_m+d_m$. The internal structure of multipliers 169 and 171 is shown in FIG. 2. While multiplier 169 performs the multiplication of $\tilde{c}_m$ times $\tilde{x}(nT-mT)\cos k\omega_0(nT-mT)$, multiplier 171 form the product of $\tilde{c}_m$ times $\tilde{x}(nT-mT)\sin k\omega_0(nT-mT)$. The latter expression is produced by the outputs of multipliers 164 and 166.

Each of the multipliers produces two product outputs. Accumulators 172 and 173 total the series of $-M$ to M outputs of multiplier 169. When this total is passed on to multipliers 176 and 177, the accumulation process starts all over again so that this operation may be characterized as accumulate and dump. This operation is the summation indicated in equation (17) which is multiplied by $\tilde{e}_n = i - j\tilde{e}$. The other inputs to multipliers 176 and 177 are the respective inphase error signal, e, and the quadrature error signal ě which are produced by upmodulator 26 of FIG. 1. Adder 178 combines the outputs of multipliers 176 and 177 to form the derivative of equation (17). As mentioned before, this derivative multiplied by $\beta$ is used to update the coefficient of Û, in accordance with equation (16). The derivative of equation (18) is similarly formed by the combined operation of accumulation 179 and 181, multipliers 182 and 183, and adder 184. The latter derivative is also scaled by $\beta$ in multiplier 152 and then used to update the coefficient $\hat{V}_1$.

As the $\hat{U}_1$ and $\hat{V}_1$ coefficients are produced by adjuster 131, adjusters 132 and 133 respectively produced $\hat{U}_2$, $\hat{V}_2$ and $\hat{U}_3$, $\hat{V}_3$. The $\hat{V}$ coefficients are applied to commutator 186 while commutator 187 receives the $\hat{U}$ coefficients. Through the action of commutators 186 and 187 the $\hat{U}_k$ term, where $k=1,2,3$, is applied to multiplier 142 and the $\hat{V}_k$ is made available to multiplier 143. The products formed by the operation of multipliers 142 and 143 using $\hat{U}_k$ and $\hat{V}_k$ for $k=1,2,3$, are summed in accumulator 144 to provide the estimate of $\hat{\psi}$ in accordance with equation (6b) at the output of sampler 146. The $\psi$ signal is applied to sin-cos lookup 33 of FIG. 1 whose trigonometric outputs are the equivalent of the exponential term of $e^{-j\hat{\psi}n}$ appearing in equation (4). Complex multiplier 16, in FIG. 1, performs the phase-jitter compensation analytically expressed in equation (4). Accordingly, the phase-jitter in the received data signal is compensated before entering equalizer 17.

Figure 6:
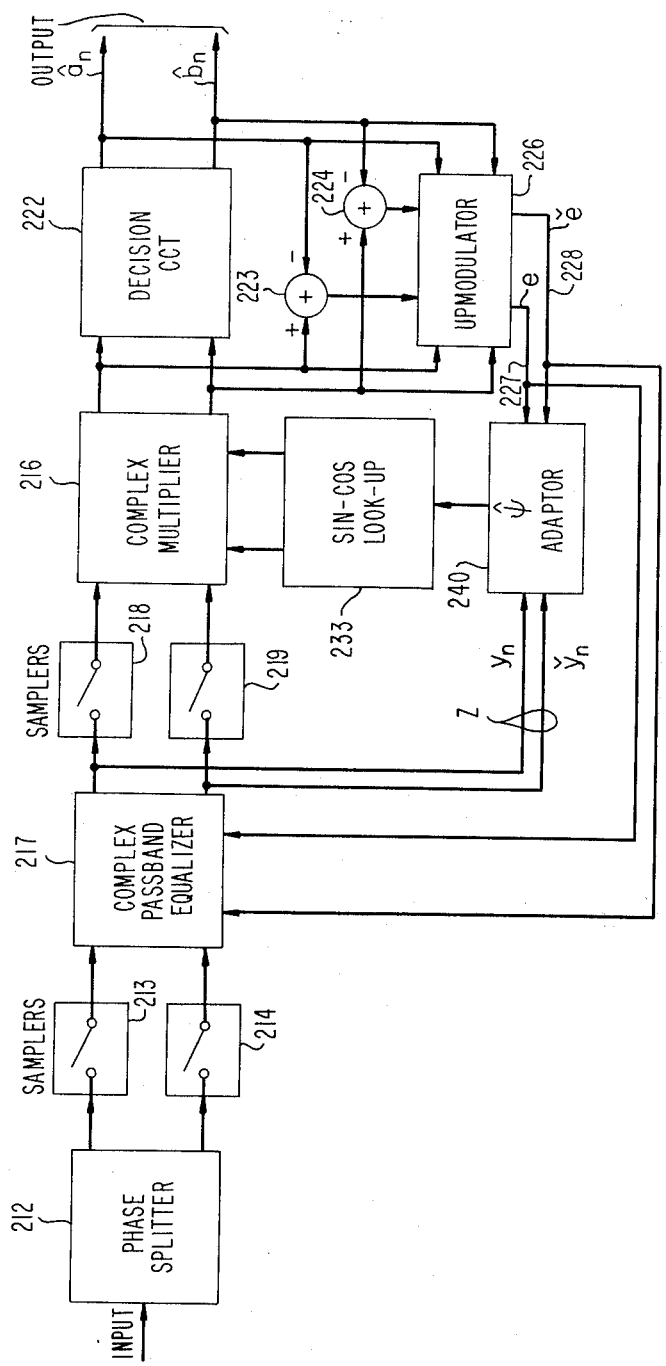
FIG. 6 is an overall block diagram of a QAM receiver wherein phase compensation is provided after equalization.

FIG. 6 is another overall block diagram of a QAM receiver wherein the inventive phase compensation technique is used after equalization. Components in FIG. 6 whose reference numerals have the last two numbers which correspond to the reference numerals of FIG. 1 have identical structure and function. Also the equivalent of phase tracker 21 in FIG. 1 is not utilized in FIG. 6 to illustrate that its use is optional. Accordingly, now located between decision circuit 221 and equalizer 217 is complex multiplier 216 which is controlled by $\hat{\psi}$ adapter 240 via sin-cos lookup 233. This configuration is more effective when the transmitted data signal experiences substantial intersymbol interference before the phase perturbance.

In this case, the demodulator output, assuming that equalizer 217 is essentially converged, may be expressed as $$\tilde{y}_n = \tilde{q}_n e^{-j\hat{\psi}n}, \tag{38}$$

where $\tilde{q}_n$ is the equalizer output, and the jitter compensation, $\hat{\psi}_n$, is now appropriate since the jitter is experienced by the transmitted signal before substantial linear distortion and thus appears as a pure rotation $e^{j\psi n}$ at the equalizer output. The squared-error is $\tilde{y}_n - \tilde{a}_n^2$, and with this model for the jitter estimate it is readily shown that $$\frac{\partial |e_n|^2}{\partial \hat{U}_k} = -2 \, Im \, \tilde{e}_n \tilde{y}_n^* \cos(k\omega_0 nT) \tag{39}$$

$$\frac{\partial |e_n|^2}{\partial \hat{V}_k} = 2 \, Im \, \tilde{e}_n \tilde{y}_n^* \sin(k\omega_0 nT) \tag{40}$$

The adaptive algorithm for post equalizer phase-jitter compensation now includes equations (16, 39 and 40).

Figure 7:
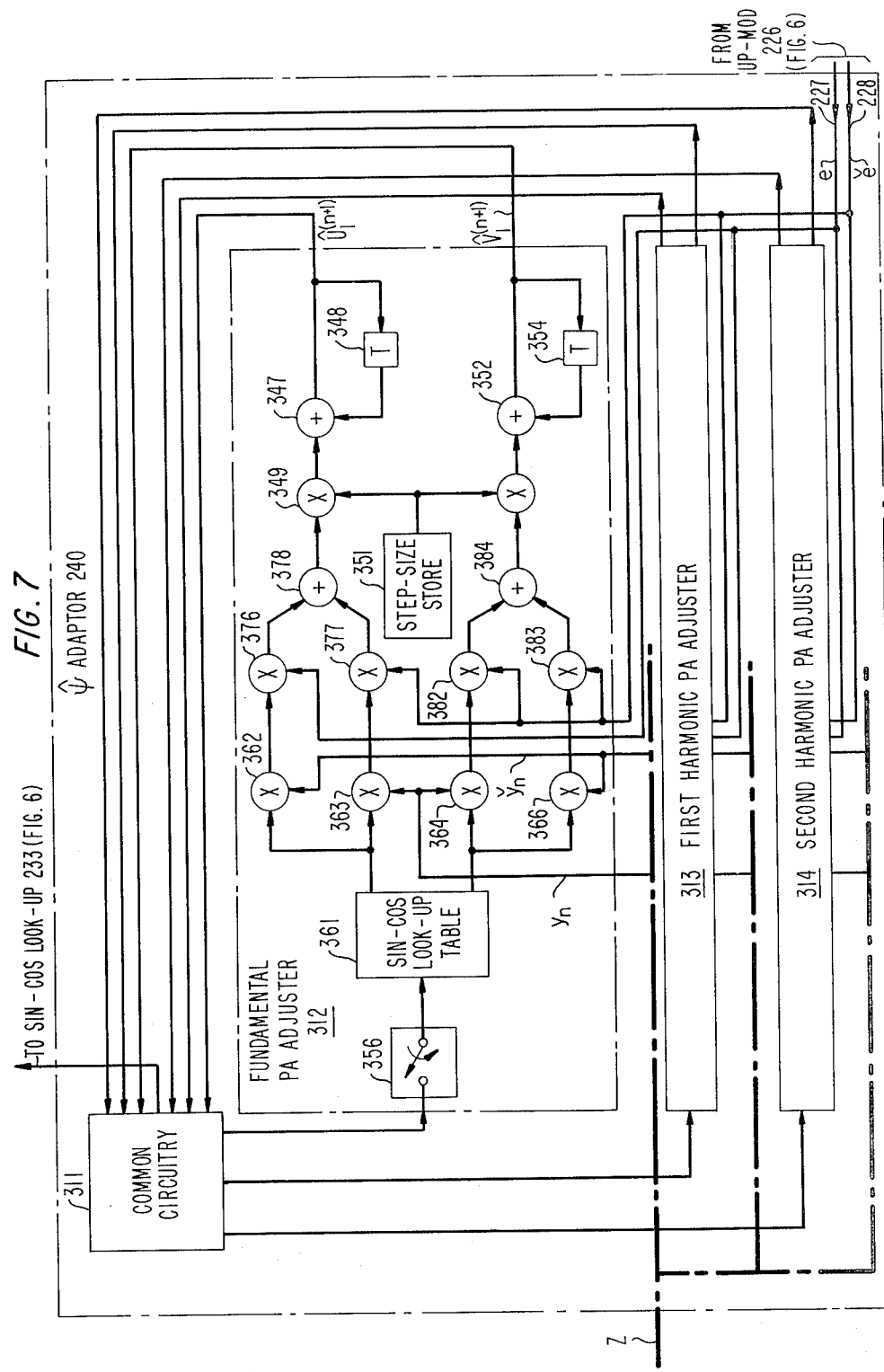
FIG. 7 depicts internal circuitry which is suitable for the adaptor used in FIG. 6.

FIG. 7 illustrates the changes necessary in $\psi$ adapter 240 as a result of equations (39 and 40). As signal inputs to $\psi$ adapter 240 the passband error signals are again required but as indicated in FIG. 6 the outputs of equalizer 217 are used instead of the tap signals and coefficient signals of FIG. 5. In FIG. 7, common circuitry 311 is shown in block form since it remains the same as that shown in FIG. 5 while phase and amplitude adjustors 312-314 actually embody these changes.

Only fundamental adjustor 312 is shown in detail since the others for the harmonics are essentially the same. As can be seen, adjustor 312 in comparison to adjustor 131 of FIG. 1 has been simplified in two respects, also reference numerals in FIG. 6 whose last two digits correspond to those of FIG. 1 are for components indicative of identical structure. First, the argument for producing the initial trigonometric coordinates allow sampler 356 to input directly into sin-cos lookup 361.

Second, the outputs of equalizer 217 directly control the modulation produced in multipliers 362, 363, 364 and 366 which each input to their respective ones of multipliers 376, 377, 382 and 383. The overall function of each of adjustors 312 and 314 remains the same as that for the adjustors of FIG. 5. Specifically this function is to vary the phase and amplitude of their respective harmonics which are combined in circuitry 311. Accordingly sin-cos lookup 233 of FIG. 6 is able to produce the rectangular trigonometric coordinate estimates for compensating the phase-jitter present in the data signal as it passes through complex multiplier 216.

It is again pointed out that the underlying assumption in placing the phase rotator of FIGS. 1 and 6 in relationship to the equalizer is concerned with when the dominant portion of the distortion occurs in the transmission of the data signal with respect to the phase-jitter. FIG. 1 is designed to compensate for the phase-jitter before equalization takes place while FIG. 6 reverses this order. When data signals are transmitted and routed automatically over the direct distance dialing telephone network as is the case for ordinary telephone calls, either assumption is most likely valid for only a certain portion of the calls. In this situation, it would be highly desirable to have a flexible arrangement for reversing the order of the application of phase-jitter compensation and equalization on the received data signal. Accordingly, those skilled in the art may employ microprocessors as controllers to select the sequence of the serially connected phase rotator and equalizer that provides the most effective compensation arrangement for the particular distortion characteristics that develop upon completion of the route of each dialed call.

Although specific application of the invention and specific circuitry embodying the invention are illustrated and described herein, various other arrangements embodying the principles of the invention may be devised by those skilled in the art without departing their spirit and scope.

We claim:

1. A receiver for phase-related linearly modulated data signals of the type wherein a dual tapped delay line equalizer (17 and 217) for the data signals includes a plurality of sections (71-1 to 71-n) each having corresponding taps from the two delay lines feeding multipliers (96-99) having their gains controlled by accumulators (122, 123 and 124, 126) jointly responsive to passband error signals and tap signals and combining means (72, 73) associated with the outputs of selected multipliers for forming phase related equalizer output signals, and wherein demodulation circuitry (22) provides decision-directed recovery of the baseband signals from the data signals and remodulation circuitry (26) utilizes the baseband signals and the data signals to form phase related passband error signals; the improvement comprising:

phase rotating means (17 and 217), serially connected to said equalizer, for modulating the phase of each of the data signals before application to the demodulation circuitry, the phase rotating means adapted to receive phase compensating rectangular trigonometric coordinate estimates and modulating the data signals with same to provide phase compensated data signals; and processing means (31 and 240) for producing the phase compensating rectangular trigonometric coordinate estimates utilizing signals selectively derived from said equalizer and the passband error signals, said processing means including clocking means (134, 136) for generating a first periodic signal whose frequency substantially corresponds to the dominant frequency component of the phase perturbation most likely to be present in the data signals, and said processing means changing the effective phase and the effective amplitude of the first periodic signal according to the signal values presented thereto to produce the phase compensating rectangular trigonometric coordinate estimates for said phase rotating means.

2. A data receiver according to claim 1 wherein said phase rotating means comprises combining means (52 and 57) for producing each of the phase compensated data signals and first and second multiplying means (51, 56 and 58, 59) for modulating each of the data signals each providing an input to one of said combining means and each having a pair of inputs connected to receive the two of the quadrature related data signals individually, each having a pair of second inputs which are each connected to receive different ones of the rectangular trigonometric coordinate estimates.

3. A data receiver according to claim 2 wherein said clock means (134 and 136-138) generates additional periodic signals in harmonic relationship to said first periodic signal and said processing means includes individual adjusting means (131 and 312) for incrementing the phase and amplitude of each of the harmonically related periodic signals.

4. A data receiver according to claim 3 wherein said phase rotating means (16) is located before said equalizer to phase compensate the data signals before application to said equalizer.

5. A data receiver according to claim 3 wherein said phase rotating means (216) is connected to receive the data signal outputs of said equalizer to provide phase compensation before application to said demodulation circuitry.

6. A data receiver according to claim 4 wherein said individual adjusting means includes fractional timing means (157, 158), connected to receive one of the periodic signals from said clocking means, for producing an output signal which divides the cycle of its periodic signal into fragmentary intervals whose total has a prescribed relationship to the number of selected sections used for providing inputs to said processing means.

7. A data receiver according to claim 5 or 6 wherein said individual adjusting means further comprises accumulating means (147, 148, 153, 154) for combining the accumulation of past rectangular trigonometric coordinate estimates with each new increment for providing the current rectangular trigonometric coordinate estimate for controlling said phase rotating means.

8. A data receiver according to claim 6 wherein said individual adjusting means further comprises lookup table means (161) connected to receive the output of said fractional timing means, said lookup table means producing signals indicative of rectangular trigonometric functions for each of said individual adjusting means.

9. A data receiver according to claim 7 wherein said processing means comprises means for sequentially (186, 187) combining the outputs of the individual adjusting means to form the coefficients of the rectangular coordinate estimates.

10. A data receiver according to claim 8 wherein said individual adjusting means further includes first multiplier means (162, 163, 164, 166) connected to receive each of the signal outputs of said lookup table means and different ones of the corresponding tap signals of the selected sections of said transversal equalizer means, said first multiplier means producing first product output signals proportional to the input signals thereto.

11. A data receiver according to claim 10 wherein said individual adjusting means further includes second multiplier means (169, 171) for producing second product outputs proportional to each of the first product output signals and the multiplier gains of the selected sections.

12. A data receiver according to claim 11 wherein said individual adjusting means further includes means for accumulating (172, 173, 179, 181) the summations of the second product outputs over a series spanning the selected sections and means for modulating (176-178, 182-184) each summation with one of the quadrature related passband error signals for producing an increment for changing the values of the rectangular trigonometric coordinate estimates.

* * * * *